United States Patent
Adachi

(10) Patent No.: US 7,979,637 B2
(45) Date of Patent: Jul. 12, 2011

(54) PROCESSOR AND METHOD FOR EXECUTING DATA TRANSFER PROCESS

(75) Inventor: Koji Adachi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 786 days.

(21) Appl. No.: 11/405,530

(22) Filed: Apr. 18, 2006

(65) Prior Publication Data

US 2006/0253654 A1 Nov. 9, 2006

(30) Foreign Application Priority Data

May 6, 2005 (JP) ................................ 2005-135068

(51) Int. Cl.
*G06F 12/00* (2006.01)
(52) U.S. Cl. .................................. 711/118; 711/E12.07
(58) Field of Classification Search .................... 711/118
See application file for complete search history.

(56) References Cited

U.S. PATENT DOCUMENTS

| | | | | |
|---|---|---|---|---|
| 6,249,880 B1 * | 6/2001 | Shelly et al. | ..................... | 714/34 |
| 6,647,485 B2 * | 11/2003 | Nguyen et al. | ................... | 712/23 |
| 7,210,029 B2 * | 4/2007 | Kondo | ............................... | 713/1 |
| 2002/0016887 A1 * | 2/2002 | Scales | ........................... | 711/140 |
| 2004/0073749 A1 * | 4/2004 | Parthasarathy et al. | ........ | 711/128 |
| 2005/0015537 A1 * | 1/2005 | Asaad et al. | ..................... | 711/2 |
| 2006/0242537 A1 * | 10/2006 | Dang | ........................... | 714/763 |

FOREIGN PATENT DOCUMENTS

| | | |
|---|---|---|
| JP | 52-155936 | 12/1977 |
| JP | 2001-184259 | 7/2001 |
| JP | 2004-240616 | 8/2004 |

OTHER PUBLICATIONS

Japanese Office Action dated Nov. 9, 2010 (with partial English translation).

* cited by examiner

*Primary Examiner* — Reginald G Bragdon
*Assistant Examiner* — Hamdy S Ahmed
(74) *Attorney, Agent, or Firm* — McGinn IP Law Group, PLLC

(57) ABSTRACT

A memory transfer routine detection unit detects a combination of instructions indicating a data transfer process in a data cache by checking instruction codes and operand codes of a sequence of instructions stored in an instruction buffer. A combination of instructions representing a data transfer process in a data cache detected by the memory transfer routine detection unit are allocated to a memory transfer unit for execution.

20 Claims, 7 Drawing Sheets

| No. | INSTRUCTION |
|---|---|
| 1 | lw v0, 0(t1) |
| 2 | lw v1, 4(t1) |
| 3 | lw a0, 8(t1) |
| 4 | lw a1, 12(t1) |
| 5 | addiu t0, t0, -1 |
| 6 | sw v0, 0(a3) |
| 7 | sw v1, 4(a3) |
| 8 | sw a0, 8(a3) |
| 9 | sw a1, 12(a3) |
| 10 | addiu t1, t1, 16 |
| 11 | addiu a3, a3, 16 |
| 12 | bnez t0, -12 |
| 13 | nop |

⇒

| INSTRUCTION |
|---|
| mem a2, t2, 1024 | t2 : FIRST ADDRESS OF TRANSFER SOURCE
a2 : FIRST ADDRESS OF TRANSFER DESTINATION

PROCESS BY MEMORY TRANSFER UNIT 27

| TIME | FETCH | RENAME | DISPATCH | ISSUE/EXECUTE | EXECUTION COMPLETED |
|------|-------|--------|----------|---------------|---------------------|
| T1 | (1)(2) | | | | |
| T2 | (3)(4) | (1)(2) | | | |
| T3 | (5)(6) | (3)(4) | (1)(2) | | |
| T4 | (7)(8) | (5)(6) | (3)(4) | (1) | |
| T5 | (9)(10) | (7)(8) | (5)(6) | (2) | |
| T6 | (11)(12) | (9)(10) | (7)(8) | (3)(5) | (1)(5) |
| T7 | (13) | (11)(12) | (9)(10) | (4) | (2) |
| T8 | mem | (13) | (11)(12) | (6)(10) | (3)(10) |
| T9 | | mem | (13) | (7)(11) | (4)(11) |
| T10 | | | | (8)(12) | (6)(12) |
| T11 | | | | (9)(13) | (7)(13) |
| T12 | | | | | (8) |
| T13 | | | | | (9) |
| T14 | | | | | |
| T15 | | | | | |
| T16 | | | mem | mem 1&2 | |
| T17 | | | ..... | ..... | mem 1&2 |
| T18 | | | | | ..... |
| T19 | | | | | |
| T20 | | | | | |
| T21 | | | | | |
| T22 | .. | | | | |

CONVENTIONAL PROCESS

| TIME | FETCH | RENAME | DISPATCH | ISSUE/EXECUTE | EXECUTION COMPLETED |
|------|-------|--------|----------|---------------|---------------------|
| T1 | (1)(2) | | | | |
| T2 | (3)(4) | (1)(2) | | | |
| T3 | (5)(6) | (3)(4) | (1)(2) | | |
| T4 | (7)(8) | (5)(6) | (3)(4) | (1) | |
| T5 | (9)(10) | (7)(8) | (5)(6) | (2) | |
| T6 | (11)(12) | (9)(10) | (7)(8) | (3)(5) | (1)(5) |
| T7 | (13) | (11)(12) | (9)(10) | (4) | (2) |
| T8 | (1)(2) | (13) | (11)(12) | (6)(10) | (3)(10) |
| T9 | (3)(4) | (1)(2) | (13) | (7)(11) | (4)(11) |
| T10 | (5)(6) | (3)(4) | (1)(2) | (8)(12) | (6)(12) |
| T11 | (7)(8) | (5)(6) | (3)(4) | (9)(13) | (7)(13) |
| T12 | (9)(10) | (7)(8) | (5)(6) | (1) | (8) |
| T13 | (11)(12) | (9)(10) | (7)(8) | (2) | (9) |
| T14 | (13) | (11)(12) | (9)(10) | (3)(5) | (1)(5) |
| T15 | | (13) | (11)(12) | (4) | (2) |
| T16 | | | (13) | (6)(10) | (3)(10) |
| T17 | ..... | ..... | ..... | (7)(11) | (4)(11) |
| T18 | | | | (8)(12) | (6)(12) |
| T19 | | | | (9)(13) | (7)(13) |
| T20 | | | | ..... | (8) |
| T21 | | | | | (9) |
| T22 | .. | | | | ..... |

Fig. 7A

RELATED ART

| No. | INSTRUCTION | MEANING |
|---|---|---|
| 1 | lw    v0,    0 (t1) | LOAD DATA |
| 2 | lw    v1,    4 (t1) | LOAD DATA |
| 3 | lw    a0,    8 (t1) | LOAD DATA |
| 4 | lw    a1,    12 (t1) | LOAD DATA |
| 5 | addiu t0, t0, −1 | LOOP CONDITION |
| 6 | sw    v0,    0 (a3) | STORE DATA |
| 7 | sw    v1,    4 (a3) | STORE DATA |
| 8 | sw    a0,    8 (a3) | STORE DATA |
| 9 | sw    a1,    12 (a3) | STORE DATA |
| 10 | addiu t1, t1, 16 | CALCULATE TRANSFER SOURCE ADDRESS |
| 11 | addiu a3, a3, 16 | CALCULATE TRANSFER DESTINATION ADDRESS |
| 12 | bnez t0, −12 | EVALUATE LOOP END CONDITION |
| 13 | nop | NO OPERATION |

Fig. 7B

RELATED ART

| No. | INSTRUCTION | MEANING |
|---|---|---|
| 1 | lw    v0,    0 (t1) | LOAD DATA |
| 2 | addiu t0, t0, −1 | LOOP CONDITION |
| 3 | sw    v0,    0 (a3) | STORE DATA |
| 4 | addiu t1, t1, 4 | CALCULATE TRANSFER SOURCE ADDRESS |
| 5 | addiu a3, a3, 4 | CALCULATE TRANSFER DESTINATION ADDRESS |
| 6 | bnez t0, −6 | EVALUATE LOOP END CONDITION |
| 7 | nop | NO OPERATION | t1 : TRANSFER SOURCE ADDRESS
a3 : TRANSFER DESTINATION ADDRESS
t0 : TRANSFER DATA SIZE
v0, v1 a0, a1 : SCRATCH REGISTER

PROCESSOR AND METHOD FOR EXECUTING DATA TRANSFER PROCESS

BACKGROUND OF THE INVENTION

1. Field of the Invention

The present invention relates to a processor for detecting a memory transfer routine from instruction sequence—and for processing the memory transfer routine in an execution unit for memory transfer.

2. Description of Related Art

A superscalar processor provided with a plurality of execution units capable of parallel operation and an out-of-order execution feature is widely known in the art. The superscalar processor improves processing speed of a processor by rearranging instructions according to dependencies between the instructions and executing independent instructions in parallel.

One of processes executed by such a processor is a process to move data in a data cache (hereinafter referred to as a memory transfer). Memory transfer is achieved by repeatedly executing load instructions for storing data in a data cache to a register and store instructions for writing data in the register to the data cache. FIGS. 7A and 7B shows examples of instruction sequence of instruction sets in RISC (Reduced Instruction Set Computer) representing a memory transfer.

Lines 1 to 4 in FIG. 7A are load instructions. For example "lw v0, 0(t1)" in line 1 instructs to load data for 1 word (32 bits) from a data cache address (t1+0) to a target register v0, where a storage value of a register t1 being a base address and an address offset value being 0.

Lines 6 to 9 in FIG. 7A are store instructions. For example "sw v0, 0(a3)" instructs to store data for 1 word to a data cache with an address (a3+0), where a storage value of a register a3 being a base address and address offset value being 0.

Lines 10 and 11 in FIG. 7A are add instructions for incrementing the register t1, a base address value indicating a data transfer source, and the register a3, a base address value indicating a data transfer destination, so as to proceed a process to the next loop.

At the end, a loop is created by a subtraction instruction in line 5 and a branch instruction in line 12 of FIG. 7A. An instruction bnez in line 12 is a branch instruction to go back 12 lines if a value of the register t0 is not equal to 0.

As shown in FIG. 7A, a memory transfer instruction is represented by a combination of a plurality of instructions including load instruction, store instruction, add address instruction, and branch instruction. An instruction routine representing a memory transfer can be expressed in various other ways than the routine shown in FIG. 7A. For example FIG. 7B has different number of load and store instructions from FIG. 7A, but it also indicates a memory transfer as in FIG. 7A. A combination of basic instructions to represent a memory transfer generally depends on a compiler for converting source code to assembly language.

As described in the foregoing, a memory transfer process is not suited for improving processing speed by an out-of-order execution because load and store instructions must be sequentially executed. Therefore it has been suggested to perform the memory transfer process in an independent execution unit (See Japanese Unexamined Patent Publication No. 2001-184259 and Japanese Unexamined Patent Publication No. 52-155936, for example).

Note that a conventional technique disclosed in Japanese Unexamined Patent Publication No. 2001-184259 etc. relates to a CISC (Complex Instruction Set Computer) processor. With CISC processor, if a complex instruction is decoded at an instruction decode stage when a memory transfer instruction is defined as one complex instruction such as move instruction, the complex instruction is issued to an execution unit exclusive for memory transfer.

On the other hand in a RISC processor, a memory transfer process is represented by a combination of a plurality of instructions, as shown in FIGS. 7A and 7B. Accordingly RISC processors are incapable of identifying a single memory transfer instruction at an instruction decode stage, as opposed to CISC processors disclosed in Japanese Unexamined Patent Publication No. 2001-184259, for example.

As described so far, we have now discovered that with RISC processor, it is difficult to recognize a memory transfer process and assign a memory transfer process to an execution unit for memory transfer process because the memory transfer process is comprised of a combination of a plurality of instructions.

SUMMARY OF THE INVENTION

According to an aspect of the present invention, there is provided a processor for retrieving a data transfer instruction in a cache memory as a combination of instructions that includes a memory transfer routine detection unit detecting a combination of instructions indicating a memory transfer process in the cache memory from a sequence of instructions by checking instruction codes and operand codes in the sequence of instructions to be executed, and a memory transfer unit executing the data transfer process in the cache memory, in which the processor assigns the combination of instructions detected by the memory transfer routine detection unit to the memory transfer unit for execution.

According to another aspect of the present invention, there is provided a method for executing a data transfer process in a case the data transfer process in cache memory is represented by a combination of a plurality of instructions, which includes detecting an existence of a combination of instructions representing a data transfer process in the cache memory from a sequence of instructions to be executed and executing the combination of instructions in an execution unit for data transfer process in the cache memory.

The processor and the method for executing a data transfer process of this invention described above are capable of detecting an existence of a memory transfer routine represented by a combination of a plurality of instructions in an instruction to be executed at an instruction decoding stage, so that a detected memory transfer process can be assigned to an execution unit for memory transfer process to be executed.

The present invention provides a processor and an execution method of a data transfer process capable of detecting a memory transfer routine represented by a combination of instructions and executing the detected memory transfer routine in an execution unit for memory transfer.

BRIEF DESCRIPTION OF THE DRAWINGS

The above and other objects, advantages and features of the present invention will be more apparent from the following description taken in conjunction with the accompanying drawings, in which:

FIG. 4 is an example of converting into a memory transfer instruction according to the present invention;

FIGS. 5A and 5B are views explaining a process of memory transfer unit according to the present invention;

FIGS. 7A and 7B are views showing an example of a group of instructions representing a memory transfer according to a conventional technique.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

An embodiment of the present invention is described hereinafter in detail with reference to the drawings. The embodiment to be described hereinbelow shows a case in which the present invention is applied to a superscalar processor for fetching two instructions per clock cycle and performing out-of-order execution.

Figure 1:
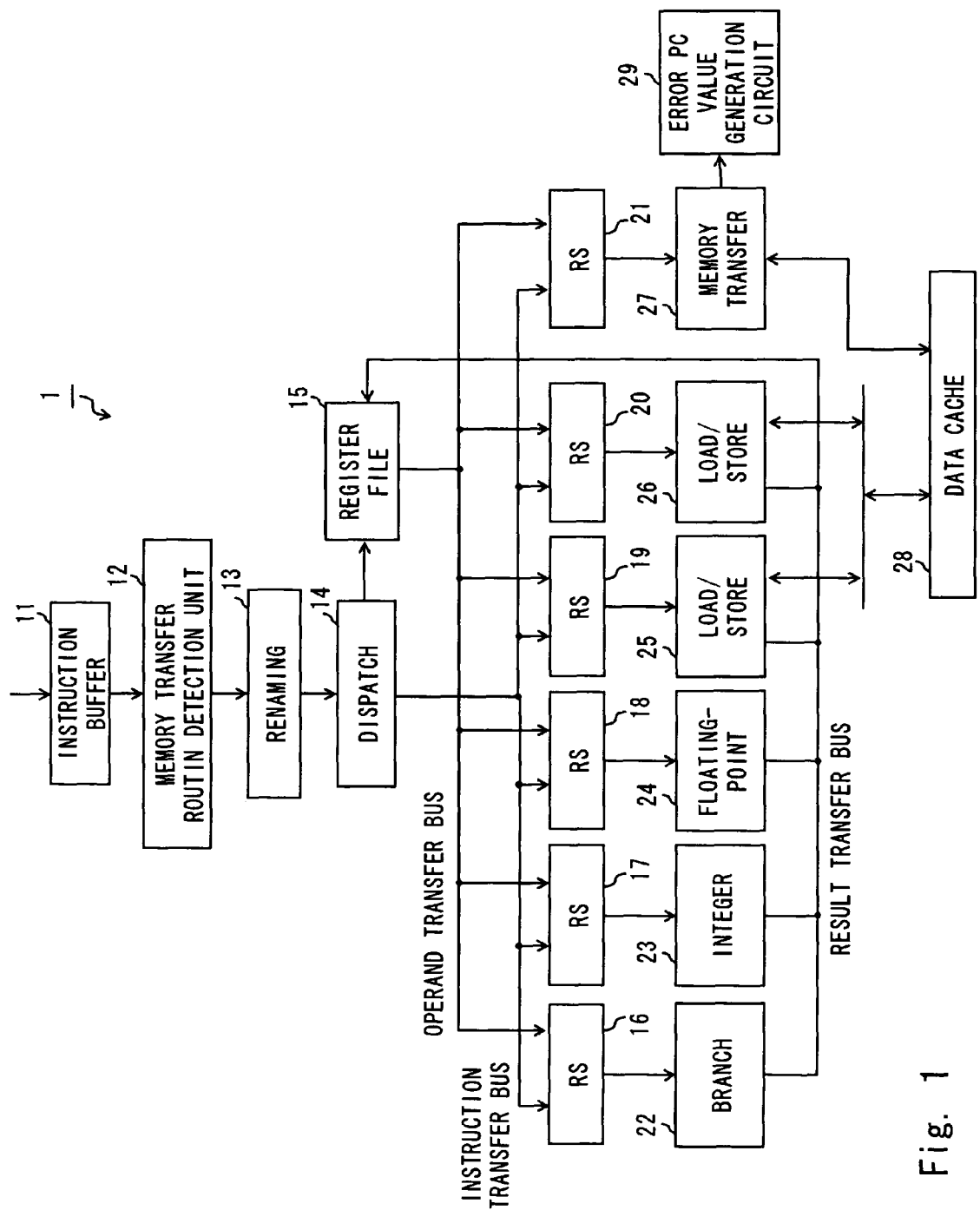
FIG. 1 is a block diagram showing a processor according to the present invention.

A configuration of a processor 1 according to the embodiment is shown in FIG. 1. An instruction buffer 11 is a register where instructions fetched from an instruction cache (not shown) are stored thereto. A memory transfer routine detection unit 12 is a circuit for detecting an instruction routine that directs a memory transfer from a sequence of instructions stored in the instruction buffer 11.

A renaming unit 13 is a control unit for dynamically mapping a logical register specified by an instruction operand with a physical register included in a register file 15 so as to avoid a conflict between register resources and to increase the number of instructions executable out-of-order.

If the memory transfer routine detection unit 12 detects an instruction routine representing a memory transfer, a group of instructions for a memory transfer is passed to the renaming unit 13 as a single pseudo internal instruction, where the internal instruction as a unit is allocated to a physical register.

An instruction dispatch unit 14 rearranges renamed instructions and issues the instructions to one of reservation stations 16 to 21. The instruction dispatch unit 14 supplies the register file 15 with a register number specified by an instruction operand, and content of an operand register is stored to the reservation stations 16 to 21.

When all operands in the reservation stations 16 to 21 are available, the instructions are executed in execution units such as a integer arithmetic unit 23, a load and store unit 25, and a memory transfer unit 27. The memory transfer instruction converted at the memory transfer routine detection unit 12 is executed in a memory transfer unit 27 which is exclusive for processing a memory transfer.

Further, in case of an exception occurred such as an address error, a TLB (Translation Look-aside Buffer) miss, and an interruption while executing a memory transfer process in the memory transfer unit 27, an error PC value generation circuit 29 generates a PC (Program Counter) value for an executed instruction, which is required for resuming after completing an exception handling, and stores the PC value to an error PC register (not shown). This enables to return to an unexecuted instruction in a group of instructions packed with a memory transfer instruction, which is a single pseudo instruction, so as to successfully resume a memory transfer process by referring to the error PC value register after completing an exception handling even if the process is executed as a memory transfer instruction.

Figure 2:
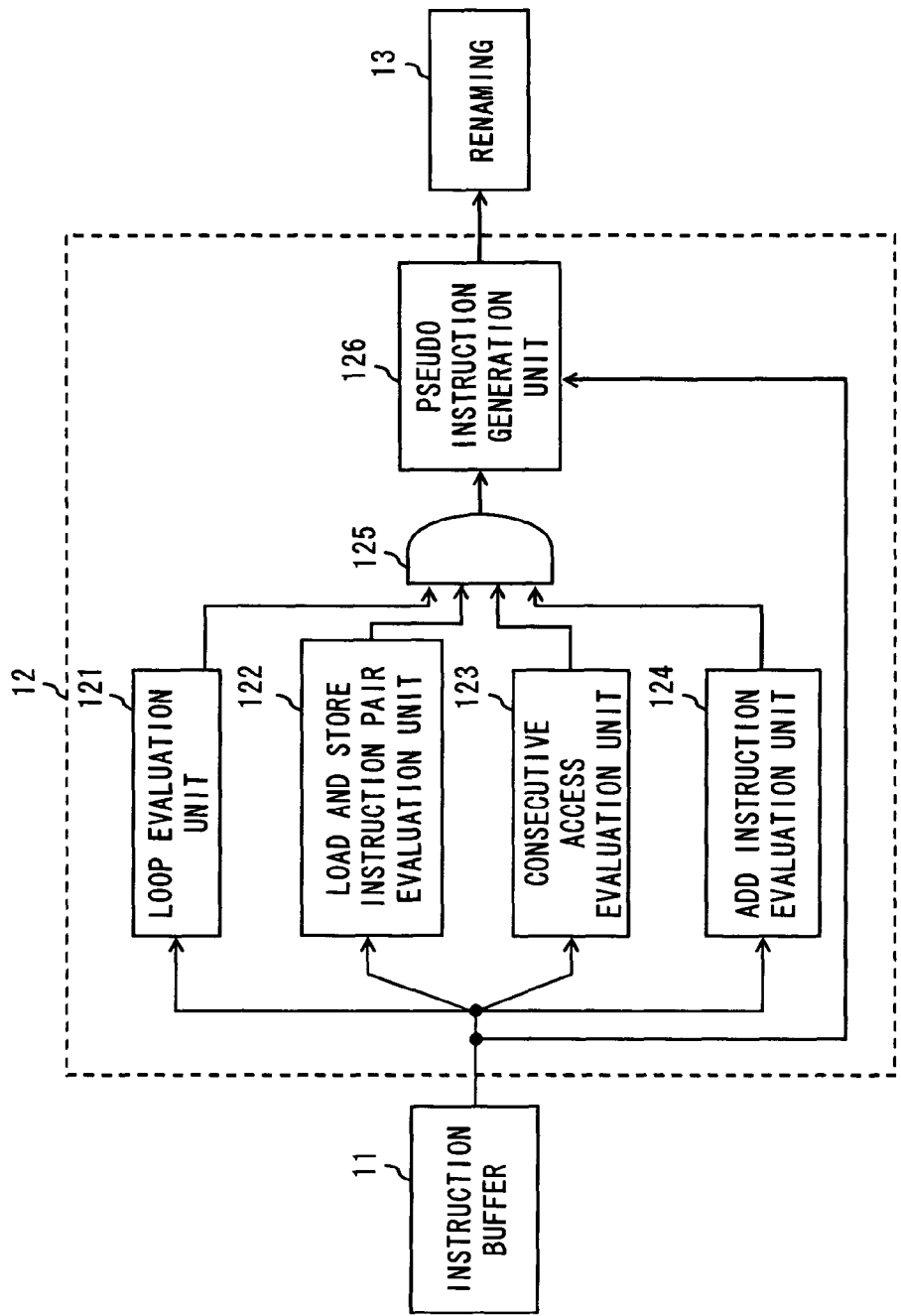
FIG. 2 is a configuration view showing a memory transfer routine detection unit according to the present invention.

A configuration and an operation of the memory transfer routine detection unit 12 are described hereinafter in detail with reference to FIGS. 2 and 3. FIG. 2 shows a configuration of the memory transfer routine detection unit 12. The memory transfer routine detection unit 12 includes a loop evaluation unit 121, a load and store instruction evaluation unit 122, a consecutive access evaluation unit 123, and an add instruction evaluation unit 124, which are for evaluating an existence of a group of instructions representing a memory transfer, and an AND circuit 125 for outputting a logical product of evaluation results from the evaluation units.

The loop evaluation unit 121 evaluates whether a loop formation exists in the sequence of instructions stored in the instruction buffer 11. It is specifically performed by checking instruction code parts of the instructions in order to detect an existence of an instruction forming a loop. In a group of instructions in FIG. 7A for example, detecting bnez instruction in line 12 confirms an existence of a loop formation.

The load and store instruction pair evaluation unit 122 determines whether a pair of load and store instruction having the same target register exists in a loop. It is specifically performed by checking instruction code parts and operands indicating a target register of instructions in the loop. In a group of instructions in FIG. 7A for example, the load and store instruction pair evaluation unit detects an existence of an instruction pair having the same target register t0 as in the load instruction in line 1 and the store instruction in line 6.

If there are a plurality of load and store instructions, the consecutive access evaluation unit 123 determines whether they access to consecutive cache address or not. It is specifically conducted by checking instruction code part and an operand indicating a target register and detecting that base addresses are the same and offset values are incremented by a constant width in operands of the respective plurality of load or store instructions. In a group of instructions in FIG. 7A for example, an evaluation result is set to true when detecting an existence of load instructions in line 1 to 4 and store instructions in line 6 to 9, in which base address registers are the same (t0 or a3) and offset values are incremented by 4 bytes (1 word).

The add instruction evaluation unit 124 evaluates whether add instructions for a base address operand of load and store instructions exist and an added value is an integer multiple of a data width (for example 1 word) of the load and store instructions. It is specifically carried out by checking a sequence of instructions to evaluate whether an instruction having an instruction code representing an add immediate instruction exists, detecting that a target register operand and a source register operand of the instruction are the same, and detecting that the operands are the same as a base address operand of a load and store instruction. In a group of instructions in FIG. 7A, an evaluation result is set to true when detecting add instructions in line 10 and 11.

The evaluation described in the foregoing does not require a complex process but can be carried out by checking instruction codes and operands. The evaluation circuits 121 to 124 therefore can be configured with a simple combination of logic circuits.

Evaluation results of the evaluation circuits are inputted to a pseudo instruction generation circuit 126 through an AND circuit 125. If all of the evaluation results of the evaluation units 121 to 124 are true, the pseudo instruction generation circuit 126 outputs a group of instructions representing a memory transfer routine to the renaming unit 13 as a single pseudo memory transfer instruction.

A first address value of a memory transfer source, a first address value of a memory transfer destination, and a memory transfer data size are assigned to operands of a memory transfer instruction. FIG. 4 is an example of converting into a memory transfer instruction. A mnemonic of a memory transfer instruction with its group of instruction indicating a memory transfer been converted is represented by a format such as "mem a2, t2, 2048". A register t2 specified by an operand of the memory transfer instruction indicates a first address of a transfer source, a register a2 indicates a first address of a transfer destination, and an immediate value 2048 indicates a data size of the memory transfer. The data size of an entire transfer data may be obtained at a memory transfer unit 27, which is described later, by extending the operand of the memory transfer instruction and specifying a first address value of the memory transfer source, a first address value of the memory transfer destination, a transfer data size per loop, and the number of loops.

The renaming unit 13 allocates a physical register to a memory transfer instruction when it receives a memory transfer instruction from the memory transfer routine evaluation circuit 12.

Figure 3:
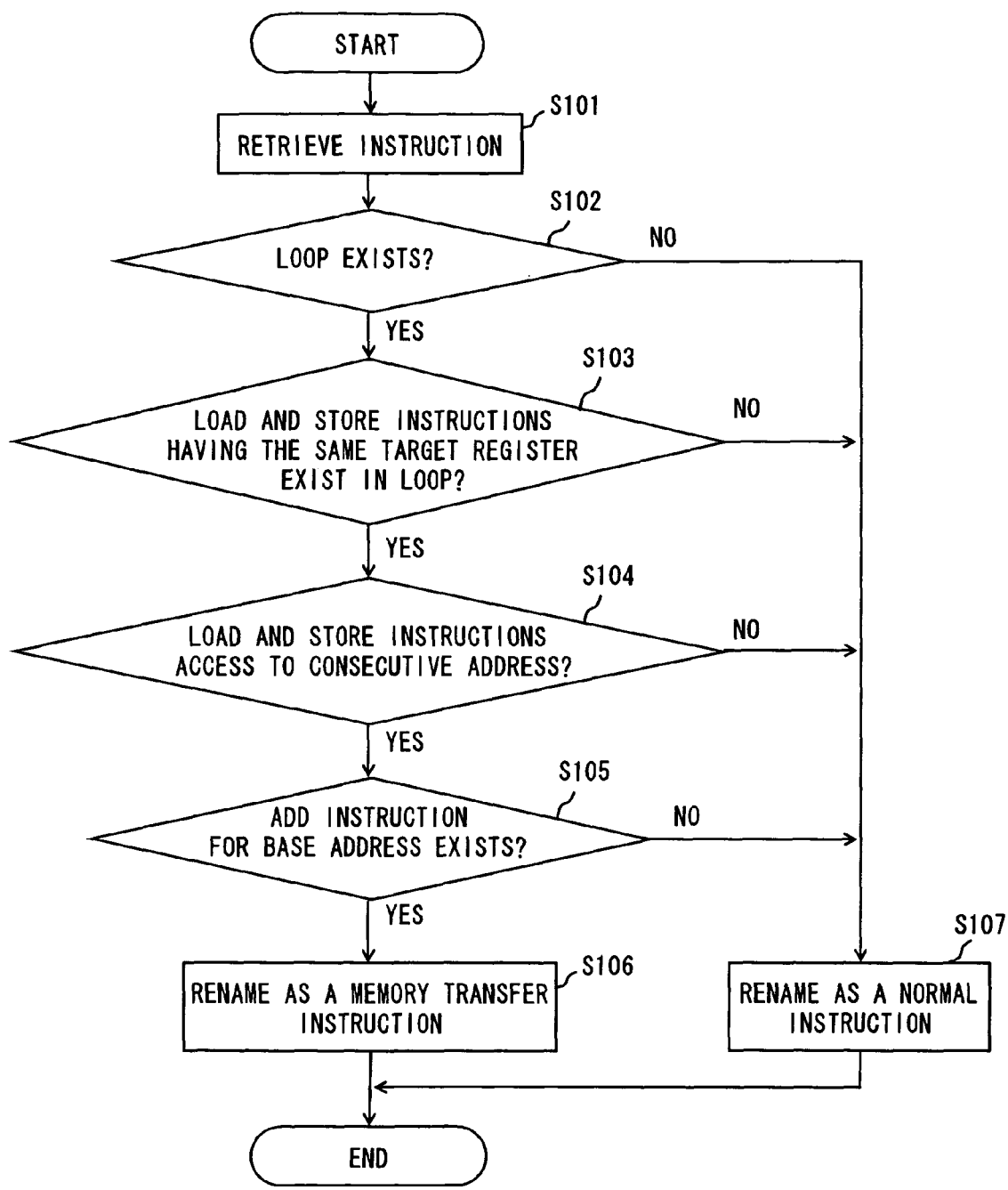
FIG. 3 is a flow chart illustrating a detection process by a memory transfer routine.

FIG. 3 is a flow chart showing a process of the above-mentioned memory transfer routine evaluation circuit 12 and the renaming unit 13. In a step S101, the memory transfer routine evaluation circuit 12 retrieves instructions from the instruction buffer 11. The memory transfer routine evaluation circuit 12 determines whether; a loop exists (S102), a load instruction and store instruction having the same target register exists (S103), a plurality of load and store instructions access to consecutive cache address (S104), an add instruction for base address of load and store instruction exists (S105). If all the evaluations from S102 to S104 are satisfied, the renaming unit 13 performs register renaming to a memory transfer instruction. On the other hand if any one of the evaluations in S102 to S104 is not satisfied, the renaming unit 13 performs a register renaming as normal instructions (S107).

A memory transfer routine can be detected by the memory transfer routine detection unit 12 statically checking a sequence of instructions stored in the instruction buffer 11, and detecting existences of (1) a branch instruction to form a loop, (2) a pair of load and store instructions, (3) instructions to consecutively access to the data cache 28, and (4) an add base address instruction for the next loop. By the detection process described above, a group of instructions separately executed in a plurality of execution units to be allocated to an execution unit exclusive for processing a memory transfer instruction as a single memory transfer instruction.

A process of the memory transfer unit 27 is described hereinafter in detail. When a memory transfer instruction is issued to the memory transfer unit 27, the memory transfer instruction is executed only in the memory transfer unit 27 without an intervening process in other execution units. Accordingly the memory transfer unit 27 is able to conduct a memory transfer process with no restriction imposed by a conventional processor architecture that exchanges data between execution units via general registers.

To execute a memory transfer routine in a conventional processor, there was a constraint imposed by a instruction set architecture of the processor. For example in MIPS (a registered trademark of MIPS Technologies, Inc.) instruction set architecture, a data process unit in a processor is restricted to a unit of 32 bit (1 word) or 64 bit (1 double words). For this reason, a memory transfer routine needs to be executed by repeating load and store instructions using general registers comprised of a unit of 1 word. Despite that a line width of a cache memory continues to expand to 128 or 256 bits, exceeding a process unit for a load and store instruction, load and store processes are limited to an execution by a data process unit in a processor which is 1 word or 1 double words, thereby failing to realize a high-speed memory transfer execution.

To overcome this problem, a microprocessor 1 of this embodiment is capable of transferring data by a line width unit of the cache memory 28 without being restricted by a data width of a general register because a memory transfer routine is bundled to be executed in the memory transfer unit 27. Thus a process of memory transfer routine can be executed faster than in a conventional processor. It further leads to a faster process of subsequent instructions having dependencies with the memory transfer instruction, thereby reducing a time generating a pipeline stall.

FIGS. 5A and 5B is a comparison between an execution of a series of memory transfer routine shown in FIG. 7A in a conventional processor and an execution of the same in the processor 1 of this embodiment. Numbers in parentheses placed in stages are the instruction numbers in FIG. 7A. For example in a fetch stage of a time T1 in FIG. 5A, two load instructions in line 1 and 2 in FIG. 7A are fetched.

FIG. 5A shows a process for 2 loops of a memory transfer routine in FIG. 7A. That is, a conventional processor requires a time T1 to T22, which amounts to 22 cycles, to process 2 loops. Further, 8 to 9 cycles are required from a start to an end of a loop execution that performs data transfer of 4 words (128 bits).

A process for a first loop by the memory transfer unit 27 shown in FIG. 5B is performed in a similar manner as the conventional process. This is because an instruction is issued before the memory transfer routine detection unit 12 detects a memory transfer as instructions stored in the instruction buffer 11 is insufficient for the memory transfer routine detection unit 12 to detect the memory transfer routine. However from a second loop of the memory transfer routine onward, the memory transfer routine detection unit 12 is able to detect the memory transfer routine from instruction s stored in the instruction buffer 11. Thus at a time T8, a memory transfer instruction (mem) is fetched. When a memory transfer instruction is issued at a time T15 after waiting for the first loop to be completed, a data transfer with transfer unit of line width for the data cache 28 can be completed in every 2 cycles. That is, if a line width of the data cache 28 is 256 bits (8 words), a data transfer of 256 bits can be completed in every 2 cycles. In comparison with a conventional process shown in FIG. 5A which requires 16 to 18 cycles for 256 bits data transfer, a process by the memory transfer unit 27 is 8 to 9 times faster. Expanding the line width of the data cache 28 makes the memory transfer process of this invention further be superior.

Figure 6:
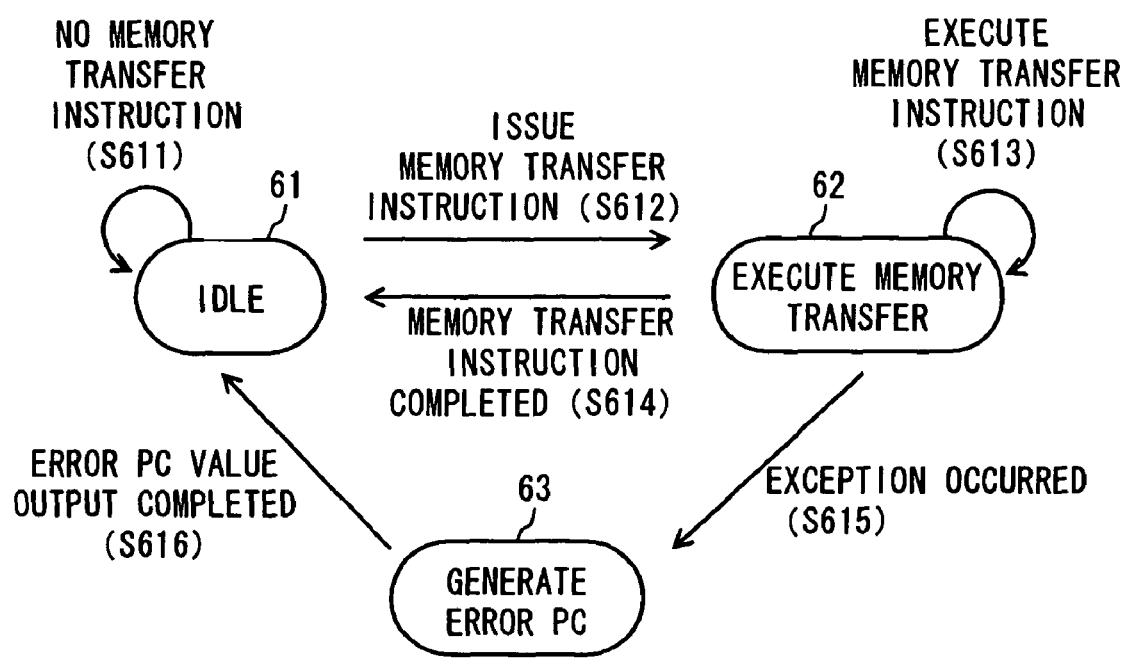
FIG. 6 is a state transition diagram of a memory transfer unit according to the present invention.

An operation of the error PC value generation circuit 29 is described hereinafter in detail. FIG. 6 is a state transition diagram for the memory transfer unit 27 and the error PC value generation circuit 29. The memory transfer unit 27 transits between an idle state 61, a memory transfer execution state 62, and an error PC generation state 63. The idle state 61 is a state waiting for a memory transfer instruction to be issued, and the memory transfer unit 27 continues to be an idle state 61 (S611) until a memory transfer instruction is issued. If a memory transfer instruction is issued during the idle state 61, the memory transfer unit 27 transits to the memory transfer instruction execution state (S612) and executes the memory transfer instruction (S613). If the memory transfer instruction is successfully completed during the memory transfer execution state 62, the memory transfer unit 27 again transits to the idle state 61 (S614).

When an exception such as a TLB miss occurs during the memory transfer execution state 62, the memory transfer unit 27 transits to the error PC generation state 63. In the error PC generation state 63, the error PC value generation circuit 29 generates-a PC (Program counter) value for an executed instruction and store the PC value to an error PC register (not shown). After the error PC value is outputted, the memory transfer unit 27 transits to the idle state 61 (S616).

As described in the foregoing, a memory transfer instruction is a pseudo instruction generated in the processor 1. To successfully resume a memory transfer process after completing an exception handling, an error PC value of a load instruction, that is completed when the process is aborted due to the exception handling, must be notified to where it is issued. With the processor 1 of this embodiment, by the error PC value generation circuit 29 generating an error PC value equivalent to the number of executed instructions and storing the PC value to an error PC register (not shown), a recovery process after an exception handling can be properly performed.

As described in the foregoing, the microprocessor 1 of this embodiment identifies a combination of instructions representing a memory transfer process from a sequence of instructions conforming to a conventional RISC instruction set and executes the identified memory transfer routine in an execution unit exclusive for processing a memory transfer routine. This enables the processor 1 to maintain compatibility with an existing instruction set architecture as well as realizing a microarchitecture capable of rapidly processing a memory transfer process.

Though a preferred embodiment of the present invention is described in detail in the foregoing, the present invention is not restricted to the above-mentioned embodiment but various changes may be made. For example, if the present invention is applied to a processor capable of executing multiple threads simultaneously using TLP (Thread-Level Parallelism) technique, an available execution unit can be assigned to other thread by executing a memory transfer routine in a memory transfer unit. This would further improve a usability of execution resources.

It is apparent that the present invention is not limited to the above embodiment and it may be modified and changed without departing from the scope and spirit of the invention.

What is claimed is:

1. A processor for retrieving a data transfer instruction in a cache memory as a combination of instructions, said processor comprising:
    a memory transfer routine detection unit detecting an existence of a combination of instructions indicating a memory transfer process in the cache memory by confirming an existence of a loop in a sequence of instructions fetched from an instruction cache, said detection unit detecting the existence of the combination of instructions by checking instruction codes and operand codes in the sequence of instructions to be executed; and
    a memory transfer unit exclusively executing a data transfer process in the cache memory,
    wherein the combination of instructions detected by the memory transfer routine detection unit is assigned to the memory transfer unit for execution.

2. The processor according to claim 1, wherein the combination of instructions indicating a data transfer process in the cache memory detected by the memory transfer routine detection unit is converted into an internal instruction and issued to the memory transfer unit.

3. The processor according to claim 2, wherein the memory transfer unit aborts an execution of the internal instruction in case of an exception handling that has been generated during an execution of the internal instruction and generates information for the instruction that corresponds to a process at a time of an abort in the combination of instructions.

4. The processor according to claim 2, further comprising a renaming unit for allocating a register resource to the internal instruction.

5. The processor according to claim 1, wherein the memory transfer unit writes and reads data in the cache memory by a unit of line width for the cache memory.

6. The processor according to claim 1, where the memory transfer routine detection unit checks in the sequence of instructions whether an instruction forming the loop exists;
    whether one or a plurality of load instructions as well as store instructions of the same number as the load instructions exist in the loop, and transfer destination registers of load data specified by operands of the load instructions are the same as transfer source registers of store data specified by operands of the store instructions;
    whether, if the plurality of load instructions and the plurality of store instructions exist, the plurality of the load instructions and the plurality of store instructions access to consecutive addresses for the cache memory; and
    whether an add instruction for an operand specifying a base address of the load instruction and an operand specifying a base address of the store instruction exist, for detecting the combination of instructions indicating a data transfer process in the cache memory.

7. The processor according to claim 1, wherein said memory transfer routine detection unit comprises:
    a loop evaluation unit;
    a load and store instruction evaluation unit;
    a consecutive access evaluation unit; and
    an add instruction evaluation unit,
    wherein the loop evaluation unit, the load and store instruction evaluation unit, the consecutive access evaluation unit, and the add instruction evaluation unit evaluate an existence of a group of instructions representing a memory transfer.

8. The processor according to claim 7, wherein said memory transfer routine detection unit further comprises:
    an AND circuit for outputting a logical product of evaluation results from the loop evaluation unit, the load and store instruction evaluation unit, the consecutive access evaluation unit, and the add instruction evaluation unit.

9. The processor according to claim 8, wherein said memory transfer routine detection unit further comprises:
    a pseudo instruction generation circuit,
    wherein evaluation results from the loop evaluation unit, the load and store instruction evaluation unit, the consecutive access evaluation unit, and the add instruction evaluation unit are inputted to the pseudo instruction generation circuit through the AND circuit.

10. The processor according to claim 9, wherein, if the evaluation results of the loop evaluation unit, the load and store instruction evaluation unit, the consecutive access evaluation unit, and the add instruction evaluation unit are true, the pseudo instruction generation circuit outputs a group of instructions representing a memory transfer routine to a renaming unit as a memory transfer instruction.

11. The processor according to claim 10, wherein the renaming unit allocates a physical register to the memory transfer instruction when it receives the memory transfer instruction from said memory transfer routine evaluation circuit.

12. The processor according to claim 1, wherein said memory transfer routine detection unit comprises:
   a loop evaluation circuit for evaluating said instruction codes in order to detect an existence of an instruction forming the loop.

13. The processor according to claim 1, wherein said memory transfer routine detection unit comprises:
   a load and store instruction pair evaluation unit for determining whether a pair of load and store instructions having a same target register exists in the loop by checking said instruction codes and said operand codes that indicate a target register of combination of instructions in the loop.

14. A method for executing a data transfer process in a cache memory represented by a combination of a plurality of instructions, said method comprising:
   detecting an existence of a combination of instructions indicating a data transfer process in the cache memory by confirming an existence of a loop in a sequence of instructions, fetched from an instruction cache, to be executed; and
   executing the combination of instructions in an execution unit exclusive for processing data transfer in the cache memory.

15. The execution method according to claim 14, wherein the detection of the combination of instructions indicating a data transfer process in the cache memory is conducted by checking instruction codes and operand codes of instructions included in the sequence of instructions, said instruction codes and operand codes indicating a target register of combination of instructions in the loop.

16. The execution method according to claim 14, wherein a writing and a reading of the data in the cache memory by the execution unit is conducted by a unit of a line width for the cache memory.

17. The execution method according to claim 14, wherein the detection of the combination of instructions indicating a data transfer process in the cache memory is conducted by evaluating whether an instruction forming the loop exists;
   whether one or a plurality of load instructions as well as store instructions of the same number as the load instructions exist in the loop, and transfer destination registers of load data for the load instructions are the same as transfer source registers of store data for the store instructions;
   whether, if the plurality of load instructions and the plurality of store instructions exist, the plurality of the load instructions and the plurality of store instructions access to consecutive addresses for the cache memory; and
   whether an add instruction for an operand specifying a base address of the load instructions and an operand specifying a base address of the store instructions exist.

18. A processor, comprising:
   a detection unit identifying a combination of instructions indicating a data transfer process in a cache memory by confirming an existence of a loop in a sequence of instructions, fetched from an instruction cache, conforming to Reduced Instruction Set Computer (RISC) instruction set and generating a pseudo instruction from the combination of instructions; and
   an execution unit exclusively executing the data transfer process in the cache memory according to the pseudo instruction.

19. The processor according to claim 18, wherein the execution unit writes and reads data in the cache memory by a unit of a line width for the cache memory.

20. The processor according to claim 18, wherein the detection unit checks in the sequence of instructions whether an instruction forming the loop exists;
   whether one or a plurality of load instructions as well as store instructions of the same number as the load instructions exist in the loop, and transfer destination registers of load data specified by operands of the load instructions are the same as transfer source registers of store data specified by operands of the store instructions;
   whether, if the plurality of load instructions and the plurality of store instructions exist, the plurality of the load instructions and the plurality of store instructions access to consecutive addresses for the cache memory; and
   whether an add instruction for an operand specifying a base address of the load instructions and an operand specifying a base address of the store instructions exist, for detecting the combination of instructions indicating a data transfer process in the cache memory.

* * * * *